US006968615B1

(12) United States Patent
More et al.

(10) Patent No.: US 6,968,615 B1
(45) Date of Patent: Nov. 29, 2005

(54) HIGH TEMPERATURE METALLIC SEAL

(75) Inventors: D. Gregory More, Middletown, CT (US); Amitava Datta, East Greenwich, RI (US); Peter G. Amos, Essex, CT (US)

(73) Assignee: The Advanced Products Company, North Haven, CT (US)

( * ) Notice: Subject to any disclaimer, the term of this patent is extended or adjusted under 35 U.S.C. 154(b) by 0 days.

(21) Appl. No.: 10/805,764

(22) Filed: Mar. 22, 2004

Related U.S. Application Data

(62) Division of application No. 10/002,684, filed on Oct. 24, 2001, now abandoned.

(60) Provisional application No. 60/242,759, filed on Oct. 24, 2000.

(51) Int. Cl.[7] ............................................. F16J 15/00
(52) U.S. Cl. ...................... 29/888.3; 29/454; 29/527.4; 277/727
(58) Field of Search ................. 29/888.3, 454, 29/527.4; 277/315, 647, 650, 652, 653, 654

(56) References Cited

U.S. PATENT DOCUMENTS

| 3,595,588 | A | * | 7/1971 | Rode | 277/650 |
| 5,249,814 | A | * | 10/1993 | Halling | 277/654 |
| 5,669,612 | A | * | 9/1997 | Nicholson | 277/614 |
| 5,716,052 | A | * | 2/1998 | Swensen et al. | 277/647 |
| 5,799,954 | A | * | 9/1998 | Layer | 277/614 |
| 6,193,240 | B1 | * | 2/2001 | Johnson et al. | 277/643 |
| 6,299,178 | B1 | * | 10/2001 | Halling | 277/654 |
| 6,302,402 | B1 | * | 10/2001 | Rynders et al. | 277/530 |
| 6,322,087 | B1 | * | 11/2001 | Swensen et al. | 277/626 |

OTHER PUBLICATIONS

"Channelled C-Ring for Hermetic Seal." IBM Technical Disclosure Bulletin, vol. 32, Issue 3A, pp. 11-12 Aug. 1989.*
Harada et al. "Alloy Design For Nickel-Base Superalloys" Oct. 4-6, 1982. available at: http://sakimori.nims.go.jp/documents/990705c.html.*

* cited by examiner

*Primary Examiner*—Eric Compton
(74) *Attorney, Agent, or Firm*—Bachman & LaPointe, P.C.

(57) ABSTRACT

A metallic seal includes a cold formed substrate layer and one or more additional layers. At least one of the layers offers improved resistance to high temperature stress relaxation.

10 Claims, 4 Drawing Sheets

HIGH TEMPERATURE METALLIC SEAL

CROSS-REFERENCE TO RELATED APPLICATIONS

This application is a divisional application of U.S. patent application Ser. No. 10/002,684 (abandoned) filed Oct. 24, 2001 and entitled "HIGH TEMPERATURE METALLIC SEAL" which claims benefit of U.S. Provisional Patent Application Ser. No. 60/242,759 filed Oct. 24, 2000 and also entitled "HIGH TEMPERATURE METALLIC SEAL." The disclosures of Ser. Nos. 60/242,759 and 10/002,684 are incorporated by reference herein as if set forth at length.

BACKGROUND OF THE INVENTION (1) Field of the Invention

This invention relates to seals, and more particularly to metallic seals.

(2) Description of the Related Art

A variety of metallic seal configurations exist. Key metallic seals are commonly held under compression between two opposed flanges of the elements being sealed to each other. Such metallic seals may be used in a variety of industrial applications.

Key examples of such metallic seals are of an annular configuration, having a convoluted radial section which permits the seal to act as a spring and maintain engagement with the flanges despite changes or variations in the flange separation. Certain such seals have an S-like section while others have a section similar to the Greek letter Σ with diverging base and top portions. Other similar seals are formed with additional convolutions. One exemplary seal is sold by The Advanced Products Company, North Haven, Conn., as the E-RING seal. Such seals are commonly formed as a monolithic piece of stainless steel or superalloy. Such seals are commonly formed from sheet stock into a shape which is effective to provide the seal with a desired range of compressibility from a relaxed condition. These seals are installed in applications in a compressed state as shown in FIG. 1. The total compression ($\Delta h_T$) consists of an elastic component ($\Delta h_{EL}$) and plastic component ($\Delta h_{PL}$) so that $$\Delta h_T = \Delta h_{EL} + \Delta h_{PL}$$

With continued exposure at elevated temperatures, the plastic component $\Delta h_{PL}$ grows resulting from creep and the elastic component $\Delta h_{EL}$ decreases with time. As a result, the sealing load or the capability of the seal to follow the flange movement also diminishes with time resulting from the reduced $\Delta h_{EL}$. This phenomenon is called stress relaxation.

BRIEF SUMMARY OF THE INVENTION

Therefore, long-term applications of current metallic seals are generally limited to about 1300° F. because the current cold formable nickel-based superalloys such as INCONEL 718 (Special Metals Corporation, Huntington, West Va.) and WASPALOY (Haynes International, Inc., Kokomo, Ind.), lose their strength at temperatures greater than 1300° F. and stress relax because of the dissolution of γ' precipitates.

There are other cast metallic alloys, such as MAR M247 (a cast superalloy used in manufacture of turbine engine blades available from Cannon-Muskegon Corporation, Muskegon, Mich., as CM 247) which are used at ultra high temperatures (about 2000° F. or 1100° C.) for thick cross-section cast and wrought components. These alloys can not readily be rolled into thinner gauges and cold formed into static seal shapes.

Recently developed mechanically alloyed strips such as MA 754 of Special Metals Corporation and PM 1000 of Plansee AG, Reutte, Austria, with superior high temperature strength characteristics are also very difficult to fabricate into seal shapes.

Some of the refractory alloy strips such as molybdenum base (e.g., titanium-zirconium-molybdenum (TZM)) and niobium base alloys, although cold formable, have poor oxidation resistance above 1200° F. (649° C.). Therefore, it is believed that no current metallic alloy can readily be cold formed into seal and used at demanding elevated temperature applications requiring enhanced stress relaxation resistance.

One aspect of the present invention advantageously combines the cold formability of the current sheet alloys and stress relaxation resistance of other metallic alloys and composites which are not cold formable. Seal shapes are formed with cold formable alloys and a layer of creep/stress relaxation resistant alloys is deposited on the already formed substrate. The substrate can be either a fully formed or partially formed shape of the seal to achieve any thickness profile on the strip. Thickness can be preferentially built up in areas with high stress.

The deposition of the creep/stress relaxation resistant layer can be accomplished by processes such as:

thermal spray of molten alloy droplets and powder;

thermal spray of creep resistant alloys with micron ($10^{-6}$ m) and submicron size ceramic particles such as zirconia, alumina and silicon carbide;

vapor deposition such as electron beam physical vapor deposition (EB PVD);

slurry coating of ceramics and curing at elevated temperatures; and/or electroforming of high temperature alloys with or without micron or submicron size ceramic particles.

The resultant metallic composite structure can advantageously be fabricated cost effectively to provide complex creep/relaxation-resistant structures for ultrahigh temperature applications. Other high temperature formed structures such as high temperature ducting, combustor liners and components for gas turbine engines can also be fabricated using this technology. Such structures may be advantageous substitutes for more expensive ceramic elements.

A second aspect involves providing an oxidation-resistant coating to a stress relaxation-resistant but oxidation-prone substrate.

BRIEF DESCRIPTION OF THE DRAWINGS

Like reference numbers and designations in the various drawings indicate like elements.

DETAILED DESCRIPTION

Figure 2:
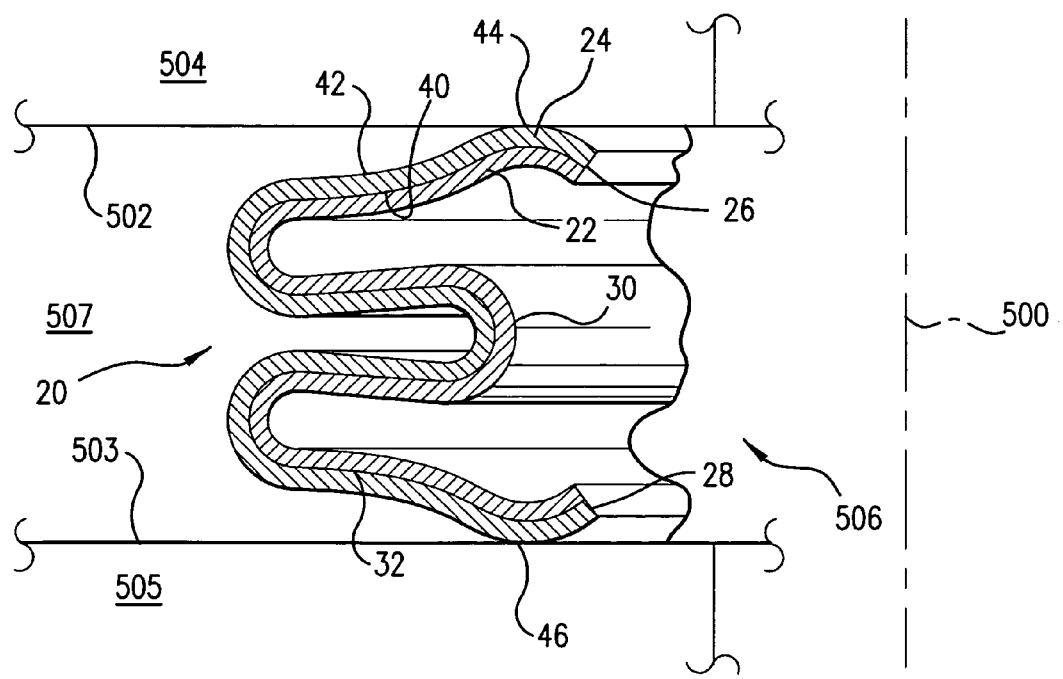
FIG. 2 is a radial sectional view of a first metallic seal according to principles of the invention.

FIG. 2 shows a seal 20 formed as an annulus having symmetry about a central longitudinal axis 500. In operation, the seal is held in compression between opposed parallel facing surfaces 502 and 503 of first and second flanges 504 and 505 to isolate an interior volume 506 from an exterior volume 507.

The seal is formed as a convoluted sleeve having first and second layers 22 and 24 and extending from a first end 26 to a second end 28. In the exemplary embodiment, the first layer 22 is generally interior of the second layer 24 and has first and second surfaces 30 and 32. In an exemplary manufacturing process, the first layer 22 is initially formed as a flat strip of cold formable material (e.g., it may be formed into a complex shape at a temperature which is less than half its Fahrenheit melting temperature and, preferably, at ambient conditions (room temperature)). The ends of the strip may be welded to form a sleeve, the two faces of the strip thereby becoming interior and exterior faces of the sleeve. The sleeve may be deformed into a convoluted shape such as that shown in FIG. 2, the interior and exterior sleeve faces becoming the surfaces 30 and 32, respectively, and the end rim surfaces of the sleeve in part defining the ends 26 and 28. After any optional additional further cleaning, machining, or surface treatment, the second layer 24 is deposited on the first layer 22. In the illustrated example, the layer 24 is gradually built up on the surface 32 with a substantially uniform thickness of a similar order of magnitude to the thickness of the layer 22. There may be additional optional machining, polishing, or surface treatment of the layer 24. Typically, however, there will be no additional machining or polishing involved. The result of this process is the production of an integrated seal in which the layers are held together not merely by macroscopic mechanical interfitting but adhesion at the microscopic level between the inner surface 40 of the layer 24 and the outer surface 32 of the layer 22. A major portion of the outer surface 42 of the layer 40 constitutes the external surface of the seal in contact with the volume 507. Portions 44 and 46 of the surface 42, slightly recessed from the ends 26 and 28, face longitudinally outward and provide bearing surfaces for contacting the flange surfaces 502 and 503 to seal therewith. Each layer makes a substantial contribution to the longitudinal compression strength and performance of the seal. Preferably in an anticipated range of operation, each contributes at least ten percent and, preferably, 30%.

Figure 6:
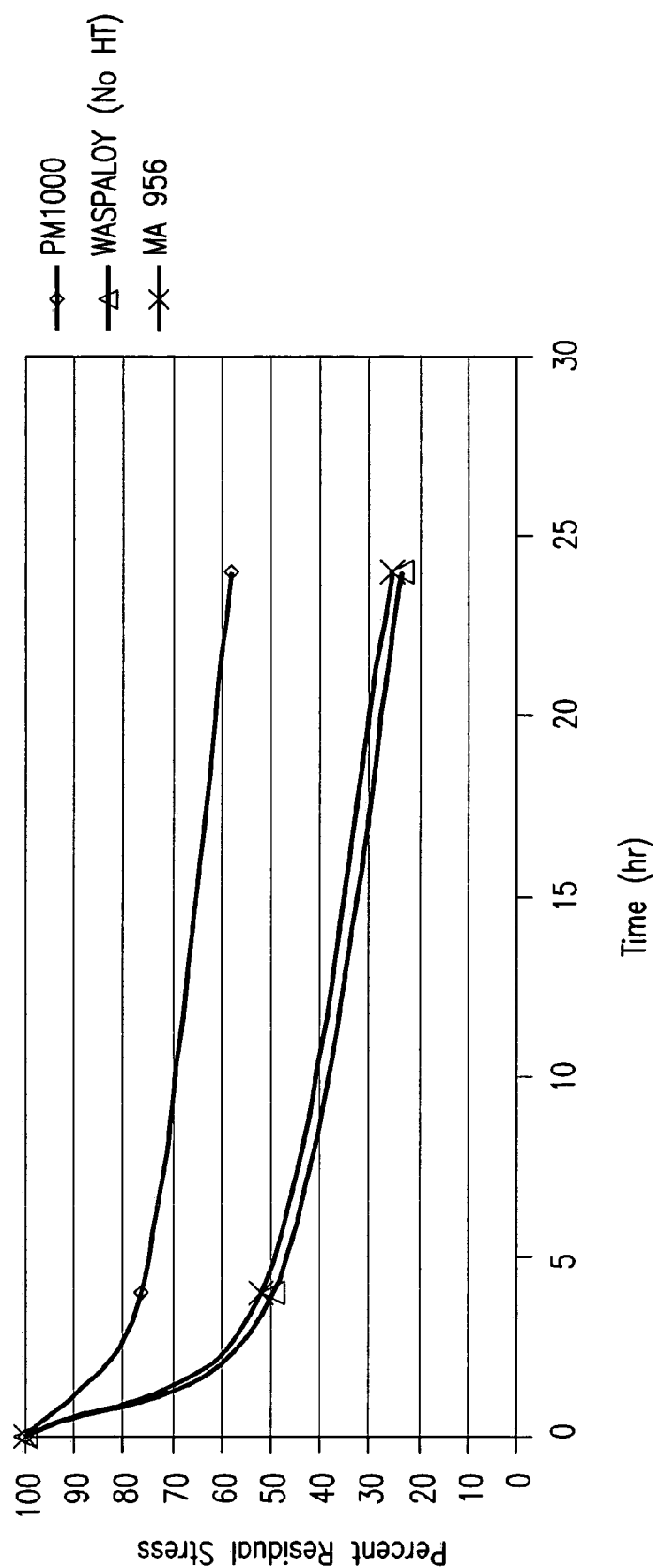
FIG. 6 is a graph of test data showing stress relaxation for various materials at 1600° F. (871° C.).
Figure 7:
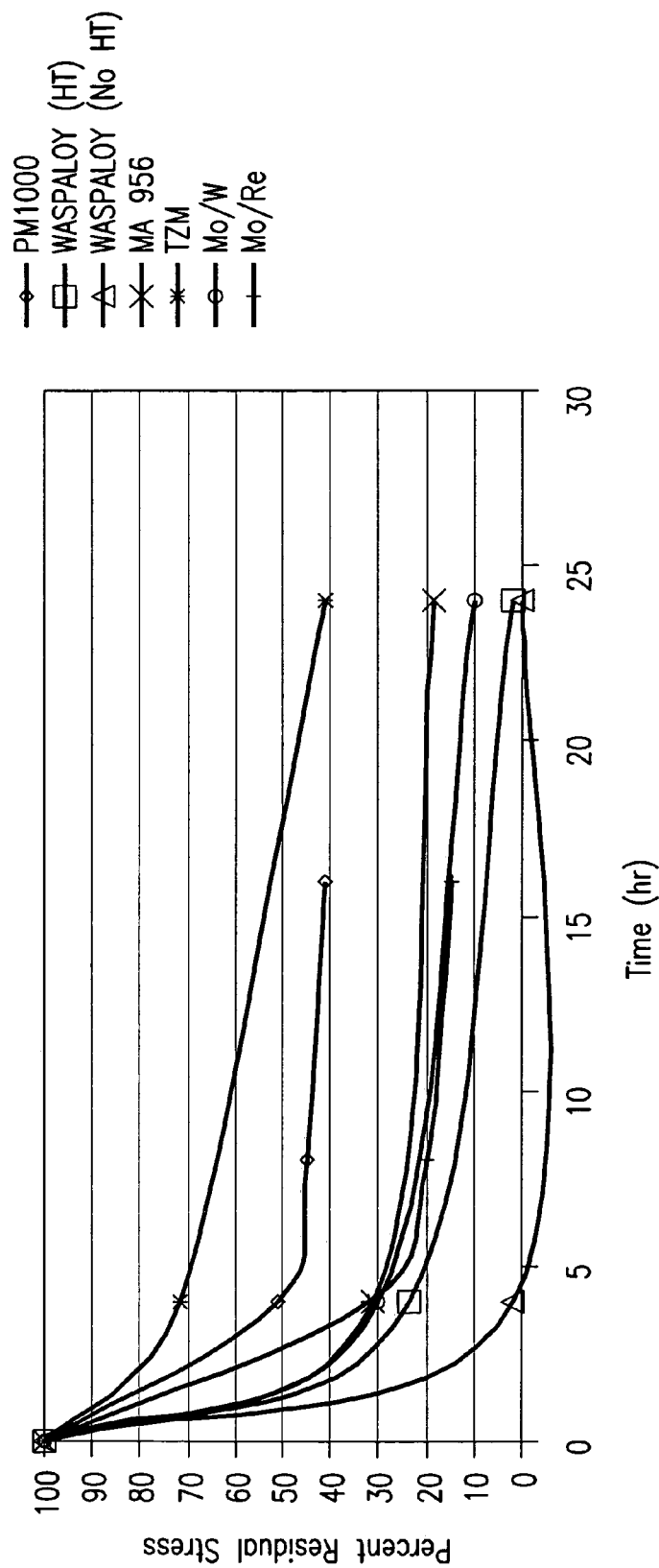
FIG. 7 is a graph of test data showing stress relaxation for various materials at 1800° F. (982° C.).

Exemplary thermal operating conditions for the seal are in the range of 1600–2000° F. (871–1093° C.) or even more. A more narrow target is 1700–1900° F. (927–1038° C.). This does not necessarily mean that the seal can not be used under more conventional conditions. Under the target operating condition, the coating layer (e.g., the second layer 24) has a higher resistance to stress relaxation or creep than does the substrate layer (e.g., the first layer 22). Preferably the substrate layer is formed of a nickel- or cobalt-based superalloy. Particularly preferred materials are WASPALOY and HAYNES 230® (UNS No. N06230). Preferred coatings are cast γ' hardened nickel-based superalloys. Particularly preferred coating materials are MAR M2000 and MAR M247. FIGS. 6 and 7 show stress relaxation according to the ASTM E-328 test for various candidate substrate and/or coating materials at low and mid target temperatures of 1600 and 1800° F. (871 and 982° C.) respectively.

Figure 3:
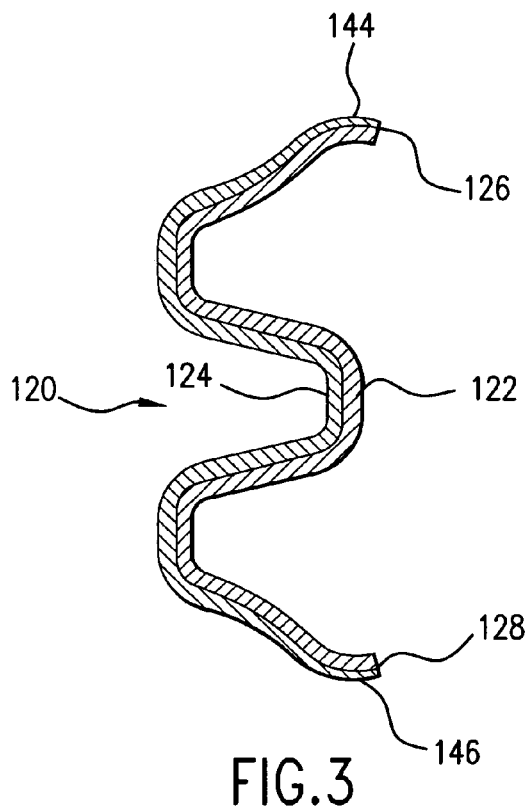
FIG. 3 is a radial sectional view of a second metallic seal according to principles of the invention.

FIG. 3 shows an alternate seal 120 having first and second layers 122 and 124. Potentially otherwise similar to the seal 20, the seal 120 has a more uneven thickness of the layer 124. In particular, the layer 124 is relatively thin near the contacting surface portions 144 and 146 near the seal ends 126 and 128.

Figure 1:
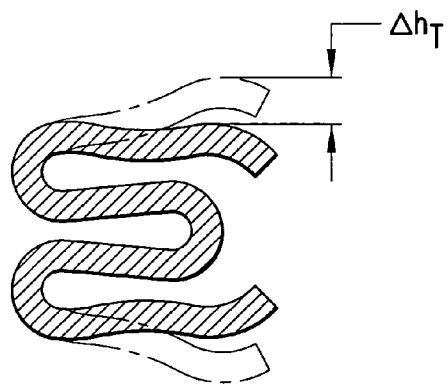
FIG. 1 is a radial sectional view of a metallic seal.
Figure 4:
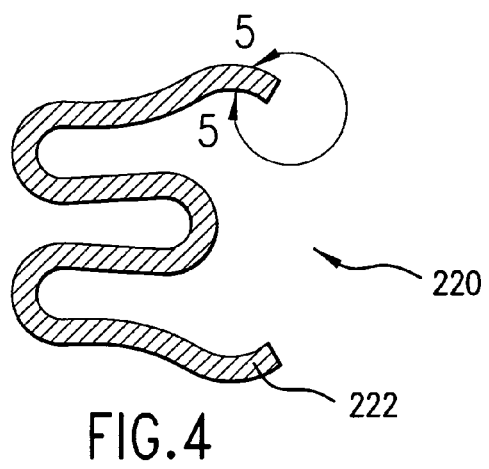
FIG. 4 is a radial sectional view of a third metallic seal according to principles of the invention.
Figure 5:
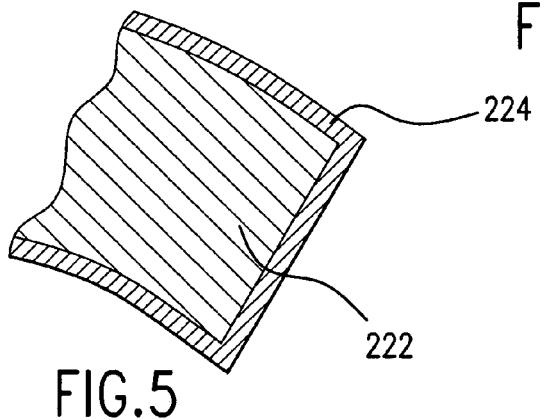
FIG. 5 is an enlarged view of the seal of FIG. 4.

FIG. 4 shows an alternate seal 220 of generally overall similar configuration to the seals of FIGS. 1–3. Structurally, the seal consists essentially of a single layer 222 of a cold formed refractory alloy strip (e.g., TZM). The entire exterior surface of the layer 222 is covered by a protective coating 224 which is not expected to substantially contribute to the strength of the seal. The coating is, however, effective to protect the underlying layer 222 from oxidation at elevated temperatures (e.g., at a target temperature in excess of 1200° F. (649° C.)). A preferred coating is molybdenum disilicide ($MoSi_2$) applied as a slurry coat followed by baking. Another preferred coating is nickel aluminide ($Ni_3Al$ or NiAl) formed by first electroplating nickel to the substrate layer 222 and then slurry coating with aluminum and baking. Alternative coatings include gold, nickel, and nickel-tungsten.

One or more embodiments of the present invention have been described. Nevertheless, it will be understood that various modifications may be made without departing from the spirit and scope of the invention. For example, the relaxation resistant material layer may be located in discrete locations along the length of the seal rather than continuously along the length. Such refractory material may be localized to portion of the seal where the greatest flexing occurs. Accordingly, other embodiments are within the scope of the following claims.

What is claimed is:

1. A process for manufacturing a seal having a central longitudinal axis and forming a seal between interior and exterior volumes when held under compression between opposed first and second parallel faces of respective first and second flanges, comprising:
   cold forming an annular first seal layer; and
   applying a second layer to a first surface of the first layer, wherein the second layer has a higher resistance to stress relaxation than does the first layer at a target operating temperature in excess of 1652° F. (900° C.).

2. The process of claim 1 wherein the applying comprises gradually building up the second layer.

3. The process of claim 1 wherein the applying directly adheres the second layer to the first layer.

4. The process of claim 1 wherein the applying adheres the second layer to the first layer along an entirety of at least one of said first surface of the first layer and an adjacent surface of the second layer.

5. The process of claim 1 wherein:
   each of the first and second layers provides at least 10% of the radial span of a radial cross-section of the seal along a majority of a length thereof; and
   each of the first and second layers provides at least 10% of the local longitudinal compressive strength of the seal along a major portion of the length thereof.

6. The process of claim 1 wherein the first layer consists essentially of a nickel- or cobalt-based superalloy.

7. The process of claim 1 wherein the second layer has a higher resistance to stress relaxation than does the first layer over a target operating temperature range of about 1600° F. (871° C.) to 2000° F. (1093° C.).

8. The process of claim 1 wherein:
   the first layer consists essentially of a first nickel-based superalloy; and
   the second layer consists essentially of a cast γ' hardened second nickel-based superalloy.

9. The process of claim 1 wherein the second layer extends continuously between first and second portions positioned for contacting the first and second faces and the first layer extends continuously between first and second portions respectively positioned longitudinally inward of said second layer first and second portions.

10. The process of claim 1 wherein the cold forming forms the first layer with a radial cross-section of bellows-like structure.

* * * * *